US008038333B2

(12) United States Patent
Konishi

(10) Patent No.: US 8,038,333 B2
(45) Date of Patent: Oct. 18, 2011

(54) VEHICLE LIGHTING FIXTURE AND METHOD

(75) Inventor: Sadayuki Konishi, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 338 days.

(21) Appl. No.: 12/367,481

(22) Filed: Feb. 6, 2009

(65) Prior Publication Data

US 2009/0207625 A1 Aug. 20, 2009

(30) Foreign Application Priority Data

Feb. 15, 2008 (JP) ................................ 2008-034773

(51) Int. Cl.
*B60Q 1/04* (2006.01)

(52) U.S. Cl. ......................... 362/517; 362/518; 362/545

(58) Field of Classification Search .................. 362/517, 362/516, 518, 545, 241, 247, 297, 304, 346
See application file for complete search history.

(56) References Cited

U.S. PATENT DOCUMENTS 7,178,960 B2 * 2/2007 Ishida .......................... 362/545
7,270,449 B2 * 9/2007 Uke .............................. 362/350
7,497,601 B2 * 3/2009 Uke .............................. 362/350
7,690,826 B2 * 4/2010 Kim .............................. 362/545

FOREIGN PATENT DOCUMENTS

JP 2005019329 1/2005

* cited by examiner

*Primary Examiner* — Bao Q Truong
(74) *Attorney, Agent, or Firm* — Kenealy Vaidya LLP

(57) ABSTRACT

A lighting fixture for use with a vehicle can switch a plurality of functions (for example, a fog lamp function and a cornering lamp function) without depending on a mechanical action. The lighting fixture can be mounted on a vehicle and can include a first light source, a second light source, and a first reflecting surface which can reflect light emitted by the first light source to form a first light distribution pattern when the first light source is turned on and can reflect light emitted by the second light source to form a second light distribution pattern different from the first light distribution pattern when the second light source is turned on.

16 Claims, 6 Drawing Sheets

RELATED ART

RELATED ART

VEHICLE LIGHTING FIXTURE AND METHOD

This application claims the priority benefit under 35 U.S.C. §119 of Japanese Patent Application No. 2008-034773 filed on Feb. 15, 2008, which is hereby incorporated in its entirety by reference.

BACKGROUND

1. Technical Field

The presently disclosed subject matter relates to a vehicle lighting fixture using a light source and, in particular, to a vehicle lighting fixture capable of switching a plurality of functions (for example, functions of a fog lamp and a cornering lamp) without depending on a mechanical action.

2. Description of the Related Art

Up to now there has been known a vehicle lighting fixture having a plurality of functions (for example, refer to Japanese Patent Application Laid-Open No. 2005-019329).

FIGS. 5 and 6 are schematic diagrams describing the configuration of the vehicle lighting fixture according to Japanese Patent Application Laid-Open No. 2005-019329.

As illustrated in FIGS. 5 and 6, the vehicle lighting fixture according to, for example, Japanese Patent Application Laid-Open No. 2005-019329 is provided with a light source 10' such as a discharge bulb and a mirror plate 30' rotated around an operating shaft 20'. Using an actuator, the mirror plate 30' is positioned in a position indicated in FIG. 5 to operate the vehicle lighting fixture as a fog lamp, on the other hand, the mirror plate 30' is positioned in a position indicated in FIG. 6 to operate the vehicle lighting fixture as a cornering lamp.

SUMMARY

The vehicle lighting fixture according to Japanese Patent Application Laid-Open No. 2005-019329, however, mechanically switches between a plurality of functions (for example, between a fog lamp and a cornering lamp) by rotating the mirror plate 30' by the actuator. This can cause a problem in that the plurality of functions (for example, a fog lamp function and cornering lamp function) cannot be used at the same time. In addition, there is a problem in that, if movable components, such as an actuator, a mirror plate and the like, malfunction, the mirror plate 30' cannot be rotated. Then, the plurality of functions (for example, fog lamp and cornering lamp functions) cannot be switched as well.

The presently disclosed subject matter has been made in view of such situations as well as in view of other considerations, problems, and features of the conventional art, and can include a vehicle lighting fixture capable of switching a plurality of functions (for example, functions of a fog lamp and a cornering lamp) without depending on a mechanical action.

A lighting fixture for use on a vehicle according to a first aspect of the presently disclosed subject matter can include: a first light source; a second light source; and a first reflecting surface which can reflect light emitted by the first light source to form a first light distribution pattern when the first light source is turned on, and can reflect light emitted by the second light source to form a second light distribution pattern different from the first light distribution pattern when the second light source is turned on.

According to the first aspect of the presently disclosed subject matter, unlike the conventional art, it is possible to electrically switch a plurality of functions (for example, functions of a fog lamp and a cornering lamp) by controlling the lighting of the first light source and the second light source, instead of through the use of mechanical switching.

Therefore, both the first light source and the second light source can be turned on to allow the simultaneous use of the plurality of functions (for example, functions of a fog lamp and a cornering lamp).

Furthermore, according to the first aspect of the presently disclosed subject matter, since movable components (such as a conventional actuator, mirror plate and the like) are not necessarily included or required for switching the plurality of functions (for example, the functions of a fog lamp and a cornering lamp), it is possible to avoid the problem of a failure to switch between or select one of the plurality of functions (for example, a fog lamp and a cornering lamp) which might occur in the conventional art as described above.

Still further, according to the first aspect of the presently disclosed subject matter, one lighting fixture (one reflecting surface) can be used to enable the realization of the plurality of functions (for example, functions of a fog lamp and a cornering lamp).

In accordance with a second aspect of the presently disclosed subject matter, in the lighting fixture mounted on a vehicle according to the first aspect, the first and second light sources can be arranged on the same straight line at a predetermined interval with their respective light emitting faces oriented in either an upward or a downward direction, and the first reflecting surface can have a parabolic cylindrical surface whose focal point can be set to or located substantially at the first light source and can extend in the horizontal direction.

The first and second light sources and a first reflecting surface can be configured to form a first light distribution pattern and a second light distribution pattern different from the first light distribution pattern. Each of the first and second light sources can include one light emitting element or a plurality of light emitting elements arranged in line.

According to the second aspect of the presently disclosed subject matter, when the first reflecting surface is configured as a parabolic cylindrical surface whose focal point is set to or located substantially at the first light source and which extends in the horizontal direction, the first reflecting surface can form a light distribution pattern greater in diffusion than a conventional vehicle lighting fixture in which a plurality of functions are switched using a mirror plate.

In accordance with a third aspect of the presently disclosed subject matter, in the lighting fixture mounted on a vehicle according to the first aspect, the first and second light sources can be provided with a plurality of light emitting elements arranged in line; the first and second light sources can be arranged at a predetermined interval with their respective light emitting faces oriented in either an upward or a downward direction; the plurality of light emitting elements of the first and second light sources can be arranged on the same straight line; and the first reflecting surface can have a parabolic cylindrical surface whose focal point is set to or located substantially at the first light source and can extend in the horizontal direction.

The first and second light sources and a first reflecting surface can be configured to form a first light distribution pattern and a second light distribution pattern different from the first light distribution pattern.

According to the third aspect of the presently disclosed subject matter, when the first reflecting surface has the parabolic cylindrical surface whose focal point can be set to or located substantially at the first light source and which extends in the horizontal direction, the first reflecting surface can form a light distribution pattern greater in diffusion than a conventional vehicle lighting fixture in which a plurality of functions are switched using a mirror plate.

In accordance with a fourth aspect of the presently disclosed subject matter, the lighting fixture mounted on a vehicle according to the second and third aspects can further include: a second reflecting surface which is arranged on one of left and right sides with respect to the first reflecting surface when viewed from the front side of the lighting fixture; and a third reflecting surface which can be arranged on the other side of the left and right sides with respect to the first reflecting surface; wherein the second reflecting surface can reflect light emitted by the first light source to form a third light distribution pattern superimposed on the first light distribution pattern when the first light source is turned on, and the third reflecting surface can reflect light emitted by the second light source to form a fourth light distribution pattern superimposed on the second light distribution pattern when the second light source is turned on.

According to the fourth aspect of the presently disclosed subject matter, the lighting fixture mounted on a vehicle can include the second reflecting surface which forms the third light distribution pattern superimposed on the first light distribution pattern and the third reflecting surface can form the fourth light distribution pattern superimposed on the second light distribution pattern. Therefore, it can be possible to form a light distribution pattern suited to achieve the plurality of functions (for example, functions of a fog lamp and a cornering lamp).

According to a fifth aspect of the presently disclosed subject matter, in the lighting fixture mounted on a vehicle according to the fourth aspect, the second reflecting surface can have a parabolic cylindrical surface whose focal point can be set to or located substantially at the first light source and can extend in the horizontal direction, and the third reflecting surface can have a parabolic cylindrical surface whose focal point can be set to or located substantially at the second light source and can extend in the horizontal direction.

In an embodiment according to the fifth aspect of the disclosed subject matter, the second reflecting surface can be configured to form the third light distribution pattern and the third reflecting surface can be configured to form the fourth light distribution pattern.

According to the fifth aspect of the presently disclosed subject matter, when the second reflecting surface has the parabolic cylindrical surface whose focal point can be set to or located substantially at the first light source and can extend in the horizontal direction, the second reflecting surface can form a light distribution pattern greater in diffusion than a conventional vehicle lighting fixture in which a plurality of functions are switched using a mirror plate. In addition, when the third reflecting surface includes a parabolic cylindrical surface whose focal point is located substantially at the second light source and extends in the horizontal direction, the third reflecting surface can form a light distribution pattern greater in diffusion than a conventional vehicle lighting fixture in which a plurality of functions are switched using a mirror plate.

Accordingly, it is possible to realize a vehicle lighting fixture according to the presently disclosed subject matter which is capable of switching a plurality of functions (for example, functions of a fog lamp and a cornering lamp) without depending on a mechanical action.

BRIEF DESCRIPTION OF THE DRAWINGS

FIG. 3 is a diagram illustrating light distribution patterns P1 and P3 formed by lights reflected from the first and second reflecting surfaces 20 and 30R on a flat vertical screen located 25 meters away from the lighting fixture of FIG. 1, when a first light source 10R is turned on;

FIGS. 4A and 4B are diagrams illustrating light distribution patterns P2 and P4 formed by light reflected from the first and third reflecting surfaces 20 and 30L on a flat vertical screen located 25 meters away from the lighting fixture of FIG. 1, when a second light source 10L is turned on;

DETAILED DESCRIPTION OF EXEMPLARY EMBODIMENTS

A vehicle lighting fixture according to an embodiment of the presently disclosed subject matter is described below with reference to the drawings.

Figure 1:
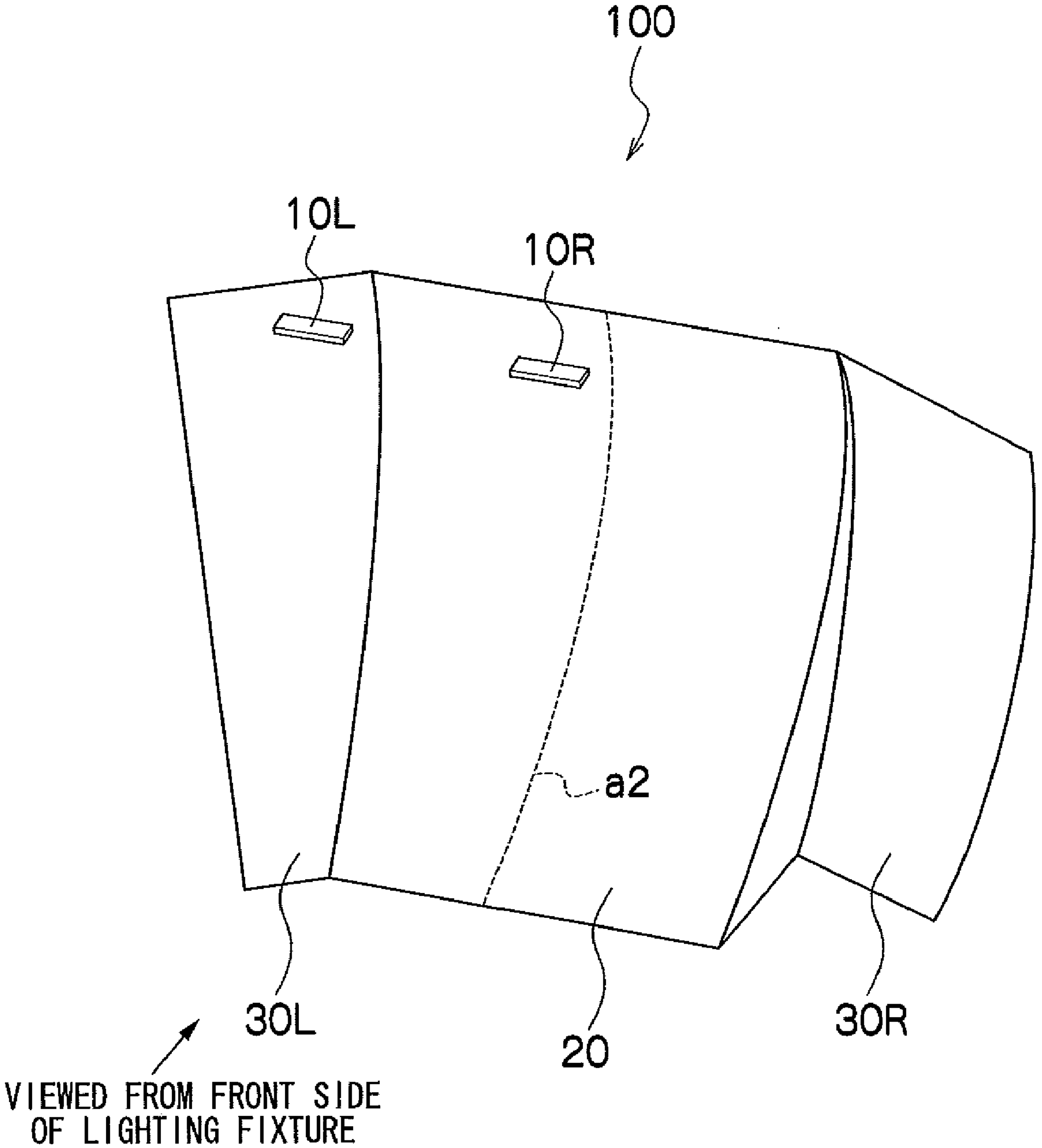
FIG. 1 is a perspective view of a vehicle lighting fixture 100 according to an embodiment of the disclosed subject matter.
Figure 2:
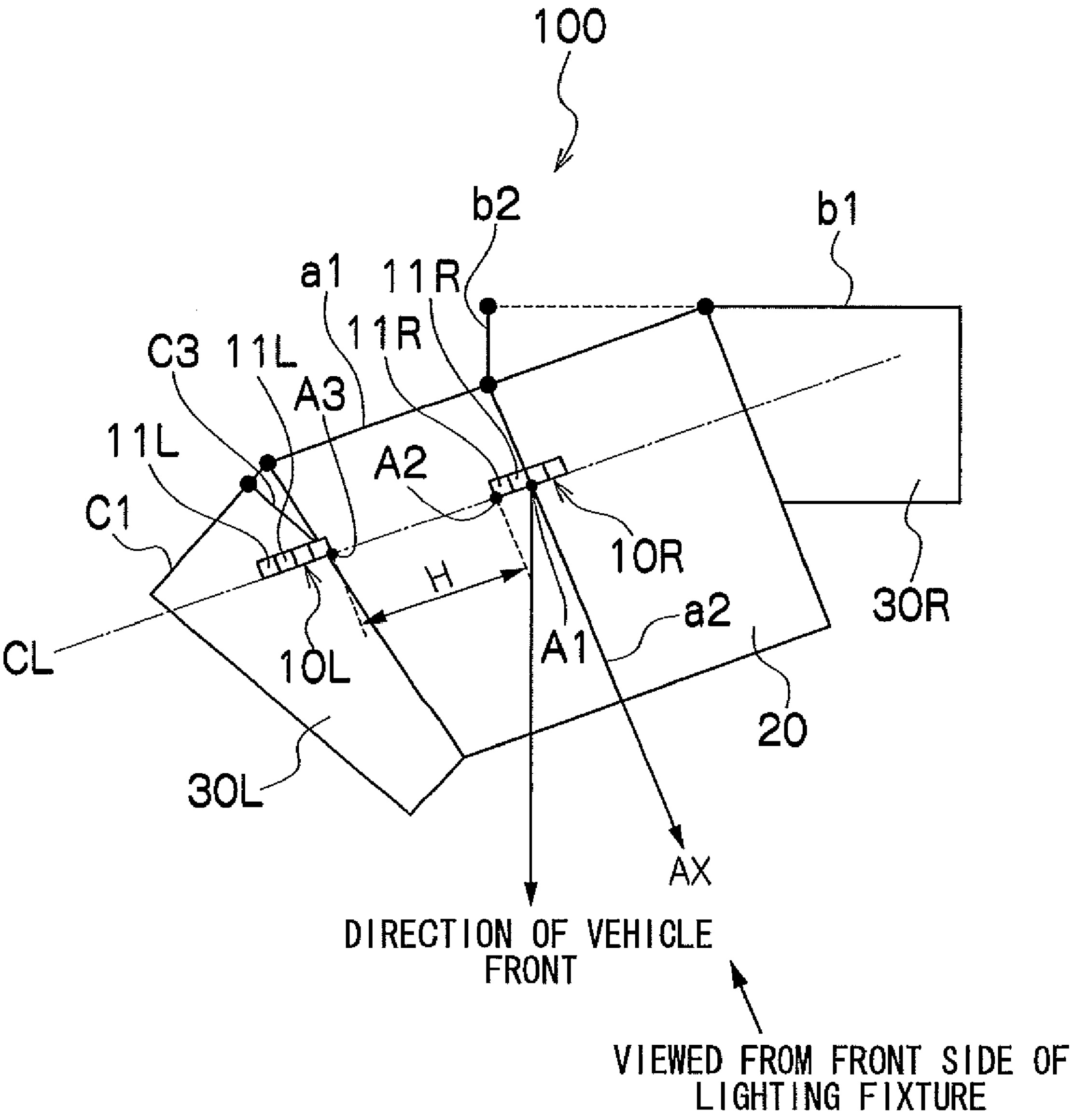
FIG. 2 is a top view of the vehicle lighting fixture 100 illustrated in FIG. 1.

FIG. 1 is a perspective view of the vehicle lighting fixture 100 according to an exemplary embodiment. FIG. 2 is a top view of the vehicle lighting fixture 100.

The vehicle lighting fixture 100 according to this exemplary embodiment can be applied to a cornering lamp that also functions as a fog lamp arranged at the corner portions of both left and right sides at the front end of a vehicle such as, for example, an automobile. As illustrated in FIGS. 1 and 2, the vehicle lighting fixture 100 can be provided with a first light source 10R arranged on the right side (the left side viewed in the direction in which a vehicle travels) in FIGS. 1 and 2, a second light source 10L arranged on the left side (the right side viewed in the direction in which a vehicle travels) in FIGS. 1 and 2, a first reflecting surface 20 and second and third reflecting surfaces 30R and 30L which can be arranged on the left and right sides of the first reflecting surface 20.

The first light source 10R can be illuminated in accordance with a fog-lamp lighting command and can emit light for forming a light distribution pattern for a fog lamp. The first light source 10R can be a semiconductor light source and can be, for example, an LED semiconductor light source package which includes a plurality of LED chips 11R having a plurality of (for example, four) light emitting elements arranged in a row.

The second light source 10L can be illuminated in accordance with a cornering-lamp lighting command and can emit light for forming a light distribution pattern for a cornering lamp. The second light source 10L can be a semiconductor light source and can be, for example, an LED semiconductor light source package which includes a plurality of LED chips 11L having a plurality of (for example, four) semiconductor light emitting elements arranged in line. Only the second light source 10L can be illuminated, only the first light source 10R can be illuminated, or both can be illuminated at the same time.

As illustrated in FIG. 2, for example, the first and second light sources 10R and 10L can be arranged at a predetermined interval H with their respective light emitting faces oriented downward when viewed from the front side of the lighting fixture (that is, oriented downward when viewed from the direction of the optical axis AX of the lighting fixture) and the plurality of the LED chips 11R and 11L can be arranged on a straight line CL (a light source axis CL) that can be orthogonal to the optical axis AX (or, the front ends of the plurality of the LED chips 11R and 11L can be aligned or located along the straight line CL).

As illustrated in FIGS. 1 and 2, the first reflecting surface 20 can be arranged at a deeper position of the first light source 10R when viewed from the front side of the lighting fixture.

Figure 3:
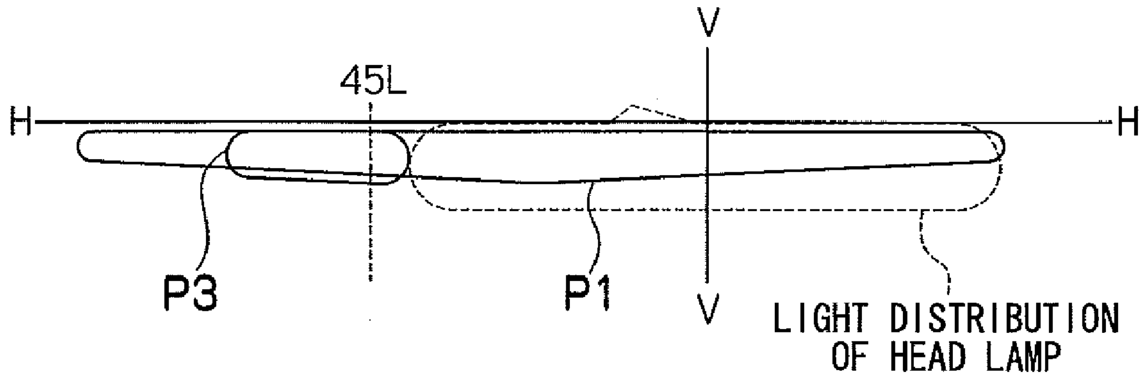
Figure 4A:
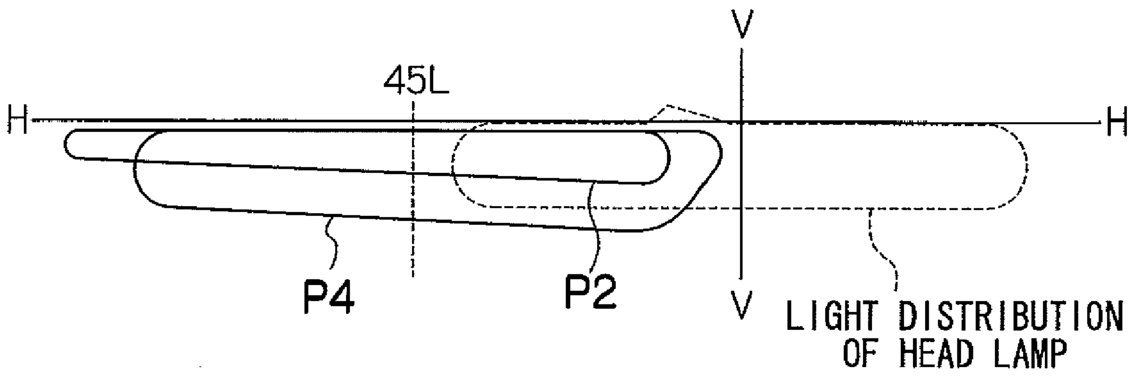

As shown in FIG. 3, when the first light source 10R is turned on, the first reflecting surface 20 can reflect light emitted by the first light source 10R to form a first light distribution pattern P1. As shown in FIG. 4A, when the second light source 10L is turned on, the first reflecting surface 20 can reflect light emitted by the second light source 10L to form a second light distribution pattern P2 different from the first light distribution pattern P1.

The first reflecting surface 20, for example, as illustrated in FIG. 2, can be shaped like a parabolic cylindrical surface whose focal point can be located substantially at or set to the middle point A1 of the first light source 10R and can extend in the horizontal direction. The first reflecting surface 20 configured as a parabolic cylindrical surface can be formed, for example, in the following manner.

FIG. 3 is a diagram for illustrating the light distribution patterns P1 and P3 formed by lights reflected from the first and second reflecting surfaces 20 and 30R on a flat vertical screen located 25 meters away, when the first light source 10R is turned on.

As illustrated in FIG. 3, the light distribution pattern P1 when the lighting fixture is configured as a fog lamp is shown, and a cross section (for example, a horizontal cross section) al of the first reflecting surface 20 used for forming the light distribution pattern P1 can be defined as illustrated in FIG. 2, for example. A parabola a2 whose focal point can be the middle point A1 of the first light source 10R (the parabola rising on the opposite side of the first light source 10R, refer to FIG. 1) can be set on the line that passes through the middle point A1 of the first light source 10R and can be orthogonal to the straight line CL.

The parabola a2 set in the above manner can be moved (swept) along the cross section al to provide a parabolic cylindrical surface whose focal point can be located substantially at or set to the middle point A1 of the first light source 10R and which can extend in the horizontal direction (extending along the cross section al in FIG. 2) from the moving locus of the parabola a2.

The first reflecting surface 20 configured as a parabolic cylindrical surface set as described above can form different light distribution patterns depending on whether the first light source 10R or the second light source 10L is turned on.

Specifically, when the first light source 10R is turned on, as illustrated in FIG. 3, the first reflecting surface 20 can reflect light emitted from the first light source 10R so as to diffuse it in the horizontal direction and can form the first light distribution pattern P1 suitable for a fog lamp. The upper end of the first distribution pattern P1 can have a cut-off line and can expand left and right. On the other hand, when the second light source 10L is turned on, as illustrated in FIG. 4A, the first reflecting surface 20 can reflect light emitted from the second light source 10L so as to diffuse it in the horizontal direction and can form the second light distribution pattern P2 which is different from the first light distribution pattern P1 and can be suitable for a cornering lamp. The upper end of the second light distribution pattern P2 can have a cut-off line and can expand left and right.

A diffusion angle at which the first reflecting surface 20 diffuses light in the horizontal direction (in the left and right directions) can be set to 30 degrees or more in the left and right directions, and can be set to 60 degrees or more in the outward direction (on the left side for the left lighting fixture and on the right side for the right lighting fixture) to conform to ECE (Economic Commission for Europe) Vehicle Regulation No. 19.

When the thus formed first reflecting surface 20 is configured as a parabolic cylindrical surface whose focal point is substantially located at or set to the middle point Al of the first light source 10R and which extends in the horizontal direction, the first reflecting surface 20 can form the light distribution patterns P1 and P2 with a greater diffusion as compared to a conventional vehicle lighting fixture in which a plurality of functions are switched using a mirror plate.

Turning on both the first and second light sources 10R and 10L can enable the simultaneous use of the functions of a fog lamp and a cornering lamp. Since movable components (such as a conventional actuator and a mirror plate) for switching the function of a fog lamp or a cornering lamp can be eliminated, it is possible to avoid a switching malfunction from occurring when switching to or between a fog lamp and/or a cornering lamp due to a failure of movable components, which failure might occur in the conventional art. Moreover, one lighting fixture 100 (or one reflecting surface 20) can be used to enable the realization of two different lighting functions (for example, a fog lamp and a cornering lamp).

In an exemplary embodiment, as illustrated in FIGS. 1 and 2, the second reflecting surface 30R can be arranged on the right side of the first reflecting surface 20 when viewed from the AX direction and the third reflecting surface 30L can be arranged on the left side when viewed from the AX direction in order to form light distribution patterns suited for a fog lamp and a cornering lamp. The first reflecting surface 20, the second reflecting surface 30R and the third reflecting surface 30L can be separately formed or can be integrally formed.

When the first light source 10R is turned on, the second reflecting surface 30R can reflect light emitted by the first light source 10R and can form a third light distribution pattern P3 superimposed on the first light distribution pattern P1.

As illustrated in FIG. 2, for example, the second reflecting surface 30R can be a parabolic cylindrical surface whose focal point can be set to or located substantially at the end point A2 of the first light source 10R and can extend in the horizontal direction. The second reflecting surface configured as a parabolic cylindrical surface can be formed in the following manner, for example.

Figure 4B:
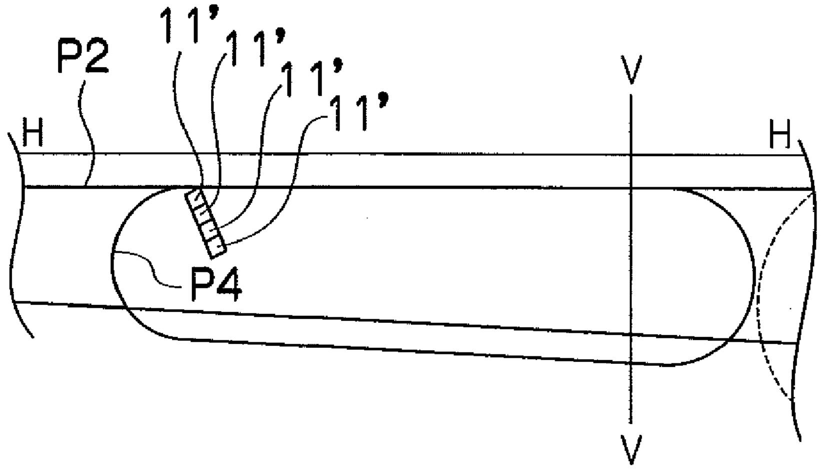
Figure 5:
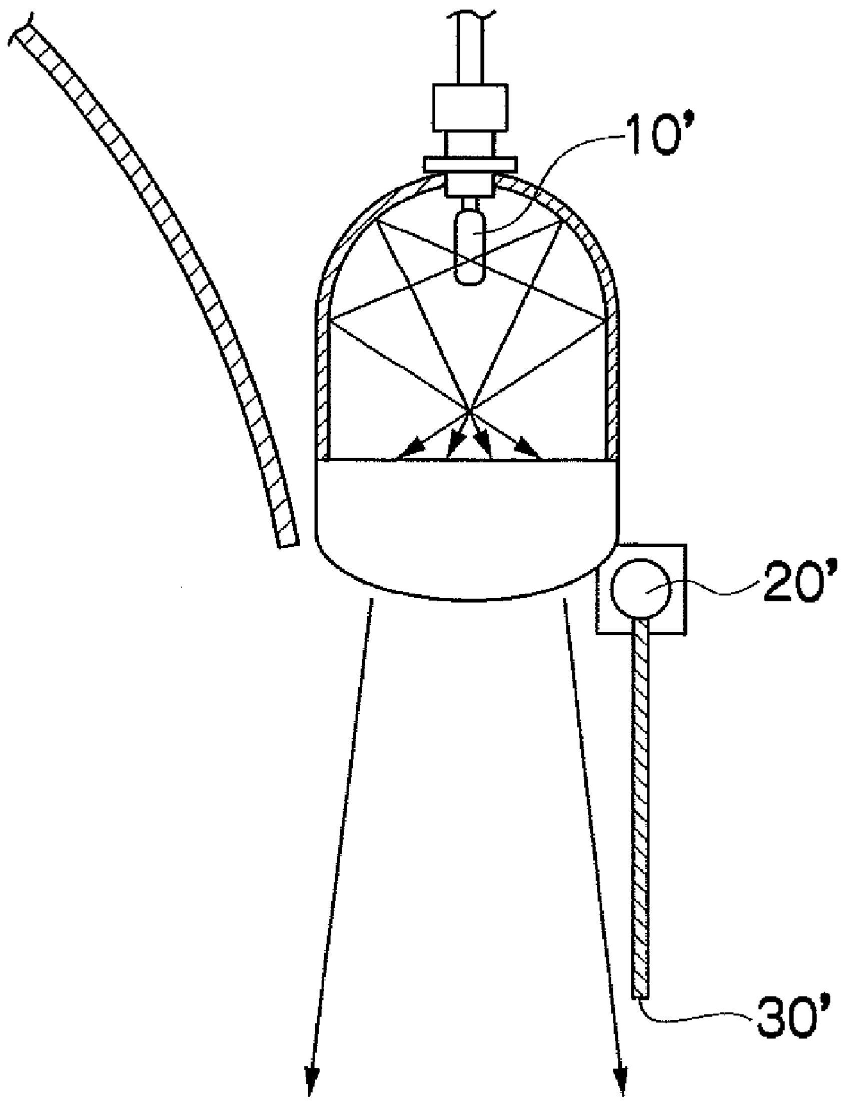
FIG. 5 is a schematic diagram illustrating the configuration of a conventional vehicle lighting fixture in which the functions of a fog lamp and a cornering lamp are switched using a moving reflective mirror.
Figure 6:
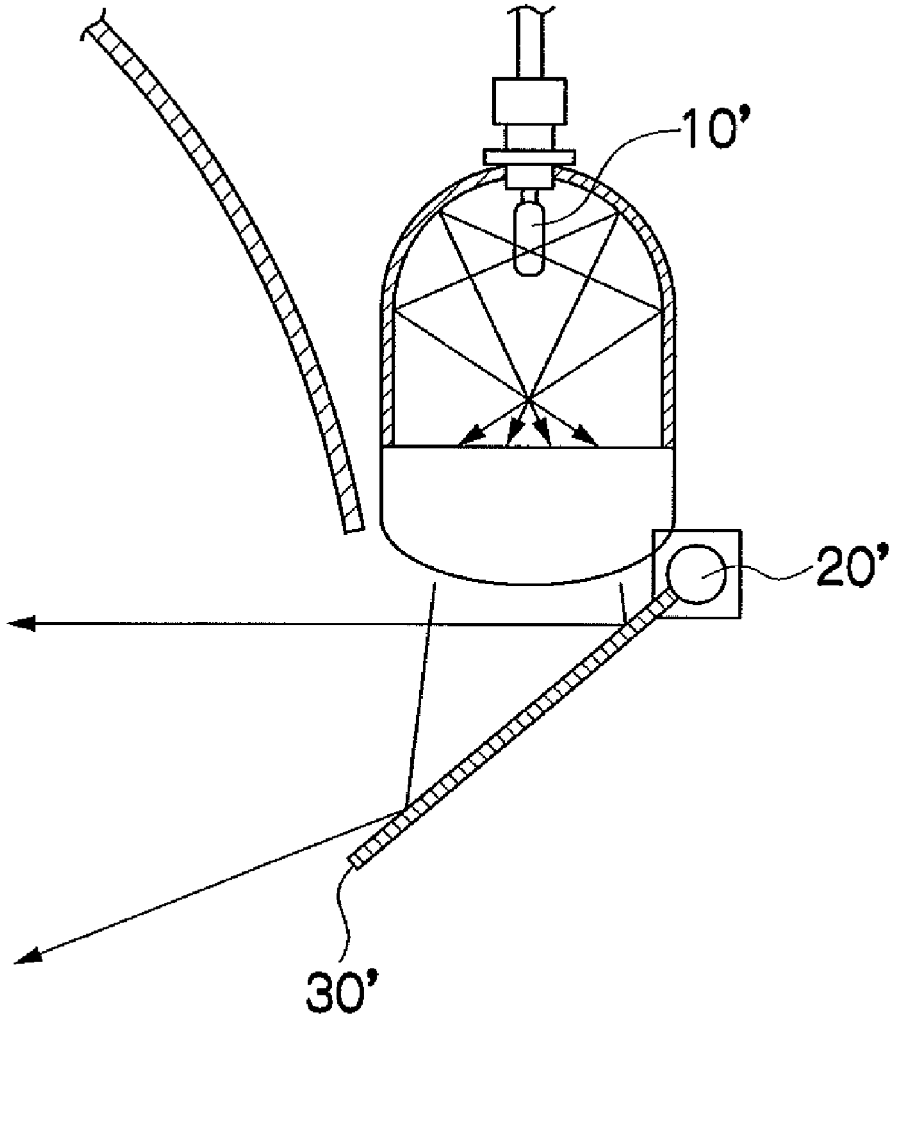
FIG. 6 is a schematic diagram illustrating the configuration of a conventional vehicle lighting fixture in which the functions of a fog lamp and a cornering lamp are switched using a moving reflective mirror.

FIG. 4A is a diagram for illustrating the light distribution patterns P2 and P4 formed by lights reflected from the first and third reflecting surfaces 20 and 30L on a flat vertical screen located 25 meters away, when the second light source 10L is turned on. FIG. 4B is a partially enlarged view of FIG. 4A.

As illustrated in FIG. 4A, the light distribution pattern P3 when the lighting fixture is configured as a fog lamp is shown and a cross section b1 of the second reflecting surface 30R (a horizontal cross section) used for forming the shown light distribution pattern P3 can be defined as illustrated in FIG. 2, for example. A parabola b2 whose focal point is the end point A2 of the first light source 10R (the parabola rising on the opposite side of the first light source 10R) can be set on the line that passes through the end point A2 (the corner on near side) of the first light source 10R on the side of the third reflecting surface 30L and can be orthogonal to the cross section b1.

The parabola b2 set in the above manner can be moved (swept) along the cross section b1 to provide a parabolic cylindrical surface whose focal point can be set to or located substantially at the end point A2 of the first light source 10R and can extend in the horizontal direction (extending along the cross section b1 in FIG. 2) from the moving locus of the parabola b2. The parabolic cylindrical surface can be configured so that it does not shield light reflected by the first reflecting surface 20.

When the first light source 10R is turned on, as illustrated in FIG. 3, the second reflecting surface 30R configured as a parabolic cylindrical surface formed in the above manner can reflect the light emitted from the first light source 10R so as to diffuse it in the horizontal direction and can form the third light distribution pattern P3 that is superimposed on the first light distribution pattern P1 (for example, the light distribution pattern for a fog lamp) formed by the first reflecting surface 20, can have a cut-off line on its upper end and can expand left and right.

A light source image of the end point A2 of the first light source 10R projected by the second reflecting surface 30R can be arranged along the upper end (the cut-off line) of the first light distribution pattern P1. This can cause the upper end of the first light distribution pattern P1 to coincide with that of the third light distribution pattern P3, which can form a light distribution configured for a fog lamp.

A diffusion angle at which the second reflecting surface 30R diffuses light in the horizontal direction (for example, the left and right directions) can be set so as to form a light distribution pattern which expands left and right with centering around 45 degree angle in the outward direction (on the left side for the left lighting fixture and on the right side for the right lighting fixture) in order to conform to ECE (Economic Commission for Europe) Vehicle Regulation No. 119. This configuration can be suitable for a fog lamp.

When the thus formed second reflecting surface 30R is configured as a parabolic cylindrical surface whose focal point is set to or located substantially at the end point A2 of the first light source 10R and which extends in the horizontal direction, the second reflecting surface 30R can form the light distribution pattern P3 greater in diffusion than a conventional vehicle lighting fixture in which a plurality of functions are switched using a mirror plate.

When the second light source 10L is turned on, the third reflecting surface 30L can reflect light emitted by the second light source 10L and can form a fourth light distribution pattern P4 superimposed on the second light distribution pattern P2.

As illustrated in FIG. 2, for example, the third reflecting surface 30L can be configured as a parabolic cylindrical surface whose focal point can be set to or located substantially at the end point A3 of the second light source 10L and can extend in the horizontal direction. The third reflecting surface configured as a parabolic cylindrical surface can be formed in the following manner, for example.

As illustrated in FIG. 4A, the light distribution pattern P4 when the lighting fixture is configured as a cornering lamp is shown and a cross section (for example, a horizontal cross section) c1 of the third reflecting surface 30L used for forming the shown light distribution pattern P4 can be defined as illustrated in FIG. 2, for example. A parabola c3 whose focal point is the end point A3 of the second light source 10L (the parabola rising on the opposite side of the second light source 10L) can be set on the line that passes through the end point A3 (the corner on near side) of the second light source 10L on the side of the second reflecting surface 30R and can be orthogonal to the cross section c1.

The parabola c3 set in the above manner can be moved (swept) along the cross section c1 to provide a parabolic cylindrical surface whose focal point can be located substantially at or set to the end point A3 of the second light source 10L and can extend in the horizontal direction (extending along the cross section c1 in FIG. 2) from the moving locus of the parabola c3. The parabolic cylindrical surface can be configured so that it does not shield light reflected by the first reflecting surface 20.

When the second light source 10L is turned on, as illustrated in FIG. 4A, the third reflecting surface 30L configured as a parabolic cylindrical surface formed in the above manner can reflect light emitted from the second light source 10L so as to diffuse it in the horizontal direction and can form the fourth light distribution pattern P4 that is superimposed on the second light distribution pattern P2 (for example, the light distribution pattern for a cornering lamp) formed by the first reflecting surface 20, can have a cut-off line on its upper end and can expand left and right.

As illustrated in FIGS. 4A and 4B, a light source image 11' of the end point A3 of the second light source 10L projected by the third reflecting surface 30L can be arranged along the upper end (the cut-off line) of the second light distribution pattern P2. This can cause the upper end of the second light distribution pattern P2 to coincide with that of the fourth light distribution pattern P4, which can form a light distribution configured for a cornering lamp.

As illustrated in FIG. 4B, the light source image 11' of the second light source 10L projected by the third reflecting surface 30L can be obliquely arranged. Thus, the fourth light distribution pattern P4 can become a light distribution which is greater in vertical width than the third light distribution pattern P3 and can be suited to light the front portion of a vehicle, which can be advantageous as a light distribution pattern for a cornering lamp.

When the thus formed third reflecting surface 30L is configured as a parabolic cylindrical surface whose focal point is set to or located substantially at the end point A3 of the second light source 10L and which extends in the horizontal direction, the third reflecting surface 30L can form the light distribution pattern P4 that is greater in diffusion than a conventional vehicle lighting fixture in which a plurality of functions are switched using a mirror plate.

As described above, unlike the conventional art, the vehicle lighting fixture 100 of the exemplary embodiment can control the lighting of the first light source 10R and the second light source 10L to electrically switch a plurality of functions on and/or off (for example, functions of a fog lamp and a cornering lamp) instead of mechanically switching between a plurality of functions.

Thus, with the vehicle lighting fixture 100 of the exemplary embodiment, both the first light source 10R and the second light source 10L can be turned on to allow the simultaneous use of the plurality of functions (for example, functions of a fog lamp and a cornering lamp).

The vehicle lighting fixture 100 of the embodiment does not utilize movable components (such as a conventional actuator, mirror plate and the like) for switching a plurality of functions (for example, functions of a fog lamp and a cornering lamp). Therefore, the vehicle lighting fixture 100 can avoid the problem that the plurality of functions (for example, functions of a fog lamp and a cornering lamp) cannot be switched due to failure in the movable components, such as can be faced by the conventional art.

According to the vehicle lighting fixture 100 of the present embodiment, one lighting fixture 100 (one reflecting surface 20) can be used to enable the realization of the plurality of functions (for example, functions of a fog lamp and a cornering lamp).

A modified example is described below.

Although the above exemplary embodiment has been described with first and second light sources 10R and 10L that can be LEDs packaged as LED chips 11R including a plurality of (for example, four) semiconductor light emitting elements arranged in line, the presently disclosed subject matter is not limited to this embodiment. For example, as long as an amount of light sufficient for both a fog lamp and also a cornering lamp can be ensured, each of the first and second light sources 10R and 10L can be constituted by one LED chip.

Although the above embodiment has been described referring to the example where the vehicle lighting fixture 100 can be configured using three reflecting surfaces (for example, the first reflecting surface 20, the second reflecting surface 30R and the third reflecting surface 30L), the presently disclosed subject matter is not limited to this embodiment. For example, a vehicle lighting fixture capable of switching a plurality of functions (for example, functions of a fog lamp and a cornering lamp) without depending on a mechanical action can be implemented using only the first reflecting surface 20.

Although the above embodiment has been described with the first light distribution pattern P1 being formed as the light distribution pattern for a fog lamp and the second light distribution pattern P2 being formed as the light distribution pattern for a cornering lamp, the presently disclosed subject matter is not limited to the embodiment. For example, the first light distribution pattern P1 can be formed as the light distribution pattern for a head lamp and the second light distribution pattern P2 can be formed as the light distribution pattern for a cornering lamp, etc.

Although the above embodiment has been described with the first and second light sources 10R and 10L being arranged with their respective light emitting faces oriented downward when viewed from the front side of the lighting fixture, the presently disclosed subject matter is not limited to the embodiment. For example, the first and second light sources 10R and 10L can be arranged with their respective light emitting faces oriented upward, obliquely downward or obliquely upward when viewed from the front side of the lighting fixture.

Although the above embodiment has been described with light sources and light emitting elements that can be semiconductor light sources and semiconductor light emitting elements, the presently disclosed subject matter is not limited to this embodiment. It should be understood that other types of light sources and light emitting elements may be used.

The foregoing embodiments are merely examples in all respects. The presently disclosed subject matter is not construed as being limited to the description of the embodiments. The presently disclosed subject matter can be implemented in other various forms without departing from the spirit and essential characteristic thereof.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. All conventional art references described above are hereby incorporated in their entireties by reference.

What is claimed is:

1. A lighting fixture for a vehicle, comprising:

a first light source;

a second light source;

a first reflecting surface which reflects light emitted by the first light source to form a first light distribution pattern when the first light source is turned on, and reflects light emitted by the second light source to form a second light distribution pattern different from the first light distribution pattern when the second light source is turned on, wherein the first light source and second light source are arranged on a common straight line at a predetermined interval with respective light emitting faces oriented in one of an upward direction and a downward direction, and the first reflecting surface has a parabolic cylindrical surface with a focal point located substantially at the first light source and the parabolic cylindrical surface extends in a horizontal direction;

a second reflecting surface arranged on at least one of a left side and a right side with respect to the first reflecting surface when viewed from a front side of the lighting fixture; and a third reflecting surface arranged on an opposite side of the first reflecting surface with respect to the at least one of the left side and right side, wherein the second reflecting surface is configured to reflect light emitted by the first light source to form a third light distribution pattern superimposed on the first light distribution pattern when the first light source is turned on, and the third reflecting surface is configured to reflect light emitted by the second light source to form a fourth light distribution pattern superimposed on the second light distribution pattern when the second light source is turned on.

2. The lighting fixture according to claim 1, wherein the second reflecting surface has a parabolic cylindrical surface with a focal point located substantially at the first light source and the parabolic cylindrical surface extends in the horizontal direction, and the third reflecting surface includes a parabolic cylindrical surface with a focal point located substantially at the second light source and the parabolic cylindrical surface of the third reflecting surface extends in the horizontal direction.

3. A lighting fixture for a vehicle, comprising:

a first light source;

a second light source;

a first reflecting surface which reflects light emitted by the first light source to form a first light distribution pattern when the first light source is turned on, and reflects light emitted by the second light source to form a second light distribution pattern different from the first light distribution pattern when the second light source is turned on, wherein each of the first and second light sources includes a plurality of light emitting elements located along a common straight line, the first and second light sources are arranged at a predetermined interval with respective light emitting faces oriented in one of an upward direction and a downward direction, the plurality of light emitting elements of the first and second light sources are located on the common line, and the first reflecting surface has a parabolic cylindrical surface with a focal point located substantially at the first light source and the parabolic cylindrical surface extends in a horizontal direction;

a second reflecting surface located on at least one of a left side and a right side with respect to the first reflecting surface when viewed from a front side of the lighting fixture; and a third reflecting surface located on an opposite side of the first reflecting surface with respect to the at least one of the left side and right side, wherein the second reflecting surface is configured to reflect light emitted by the first light source to form a third light distribution pattern superimposed on the first light distribution pattern when the first light source is turned on, and the third reflecting surface is configured to reflect light emitted by the second light source to form a fourth light distribution pattern superimposed on the second light distribution pattern when the second light source is turned on.

4. The lighting fixture according to claim 3, wherein the second reflecting surface includes a parabolic cylindrical surface with a focal point located substantially at the first light source and the parabolic cylindrical surface extends in the horizontal direction, and the third reflecting surface has a parabolic cylindrical surface with a focal point located substantially at the second light source and the parabolic cylindrical surface of the third reflecting surface extends in the horizontal direction.

5. A lighting fixture for a vehicle, comprising:

a first semiconductor light source;

a second semiconductor light source; and a first reflecting surface which reflects light emitted by the first semiconductor light source to form a first light distribution pattern when the first semiconductor light source is turned on, and reflects light emitted by the second semiconductor light source to form a second light distribution pattern different from the first light distribution pattern when the second semiconductor light source is turned on, wherein the first semiconductor light source and the second semiconductor light source are arranged on a same straight line at a first interval, the first semiconductor light source and the second semiconductor light source each comprises a plurality of semiconductor light emitting elements on the same straight line at a second interval that is narrower than the first interval, the first semiconductor light source and second semiconductor light source are arranged with their respective light emitting faces oriented either one of upward or downward, and the first reflecting surface has a parabolic cylindrical surface with a focal point set to the first semiconductor light source and extends in a horizontal direction.

6. The lighting fixture according to claim 5, wherein each of the semiconductor light sources includes a semiconductor light source package including a plurality of LED chips.

7. A lighting fixture for a vehicle, comprising:

a first light source;

a second light source;

a first reflecting surface which reflects light emitted by the first light source to form a first light distribution pattern when the first light source is turned on, and reflects light emitted by the second light source to form a second light distribution pattern different from the first light distribution pattern when the second light source is turned on, wherein each of the first light source and second light source includes at least one semiconductor light source, respectively, and each of the semiconductor light sources includes a semiconductor light source package including a plurality of LED chips;

a second reflecting surface; and a third reflecting surface, wherein the first reflecting surface is located between the second reflecting surface and third reflecting surface and each of the first reflecting surface, second reflecting surface, and third reflecting surface includes a separate parabolic cylindrical surface distinct with respect to each other.

8. The lighting fixture according to claim 7, wherein the first reflecting surface and the second reflecting surface are configured to reflect light from the first light source to form the first light distribution pattern when the first light source is turned on.

9. The lighting fixture according to claim 8, wherein the first reflecting surface and the third reflecting surface are configured to reflect light from the second light source to form the second light distribution pattern when the second light source is turned on.

10. The lighting fixture according to claim 5, wherein:

the first semiconductor light source includes a plurality of LED chips located along the same straight line; and the second semiconductor light source includes a second plurality of LED chips located along the same straight line.

11. A lighting fixture for a vehicle, comprising:

a first light source;

a second light source;

a first reflecting surface which reflects light emitted by the first light source to form a first light distribution pattern when the first light source is turned on, and reflects light emitted by the second light source to form a second light distribution pattern different from the first light distribution pattern when the second light source is turned on;

a second reflecting surface, and a third reflecting surface, wherein the first reflecting surface is a parabolic cylindrical surface with a first focal point located at a center of the first light source, the second reflecting surface is a parabolic cylindrical surface with a second focal point located at an end of the first light source, and the third reflecting surface is a parabolic cylindrical surface with a third focal point located at an end of the second light source.

12. A method for controlling a plurality of light distribution patterns formed by the lighting fixture according to claim 5, comprising:

providing the first semiconductor light source, the second semiconductor light source spaced from the first semiconductor light source, and the first reflecting surface;

selecting one of a first lighting mode, a second lighting mode, and a third lighting mode;

when the first lighting mode is selected, emitting light from the first semiconductor light source and reflecting the light emitted by the first semiconductor light source with the first reflecting surface to form the first light distribution pattern;

when the second lighting mode is selected, emitting light from the second semiconductor light source and reflecting the light emitted by the second semiconductor light source with the first reflecting surface to form the second light distribution pattern that is different from the first light distribution pattern; and when the third lighting mode is selected, simultaneously emitting light from the first semiconductor light source and the second semiconductor light source, reflecting the light emitted by the first semiconductor light source with the first reflecting surface to form the first light distribution pattern and reflecting the light emitted by the second semiconductor light source with the first reflecting surface to form the second light distribution pattern.

13. The method according to claim 12, wherein:

providing the first semiconductor light source includes providing the first semiconductor light source with a first plurality of LED chips located along the same straight line, and providing the second semiconductor light source includes providing the second semiconductor light source with a second plurality of LED chips located along the same straight line.

14. A method for controlling a plurality of light distribution patterns formed by a multifunction lighting fixture for a vehicle comprising:

providing a first light source, a second light source spaced from the first light source, and a reflector;

selecting one of a first lighting mode, a second lighting mode, and a third lighting mode;

when the first lighting mode is selected, emitting light from the first light source and reflecting the light emitted by the first light source with the reflector to form a first light distribution pattern;

when the second lighting mode is selected, emitting light from the second light source and reflecting the light emitted by the second light source with the reflector to form a second light distribution pattern that is different from the first light distribution pattern; and when the third lighting mode is selected, simultaneously emitting light from the first light source and the second light source, reflecting the light emitted by the first light source with the reflector to form the first light distribution pattern and reflecting the light emitted by the second light source with the reflector to form the second light distribution pattern, wherein providing the first light source includes providing a first semiconductor light source including a first plurality of LED chips located along a common straight line, providing the second light source includes providing a second semiconductor light source including a second plurality of LED chips located along the common straight line, and providing the reflector includes providing a first reflecting surface, a second reflecting surface adjacent to one side of the first reflecting surface, and a third reflecting surface adjacent to another side of the first reflecting surface.

15. The method according to claim 14, wherein:

reflecting the light emitted from the first light source includes reflecting the light emitted from the first light source with the first reflecting surface and second reflecting surface; and reflecting the light emitted from the second light source includes reflecting the light emitted from the second light source with the first reflecting surface and third reflector surface.

16. The method according to claim 15, wherein providing the first, second and third reflecting surfaces includes:

forming the first reflecting surface as a parabolic cylindrical surface with a first focal point;

locating the first focal point at a center of the first light source;

forming the second reflecting surface as a parabolic cylindrical surface with a second focal point;

locating the second focal point at an end of the first light source;

forming the third reflecting surface as a parabolic cylindrical surface with a third focal point; and locating the third focal point at an end of the second light source.

* * * * *